Sept. 24, 1935.  M. J. MARTY ET AL  2,015,231
AUTOMOBILE HEATER
Filed Dec. 7, 1934
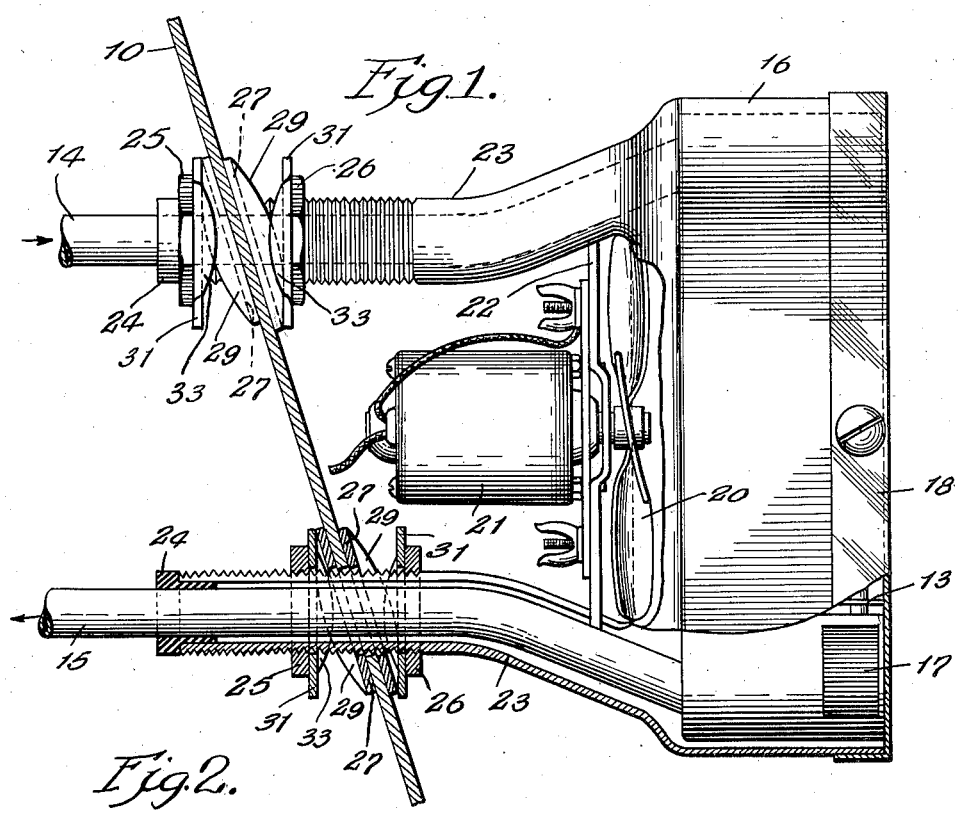
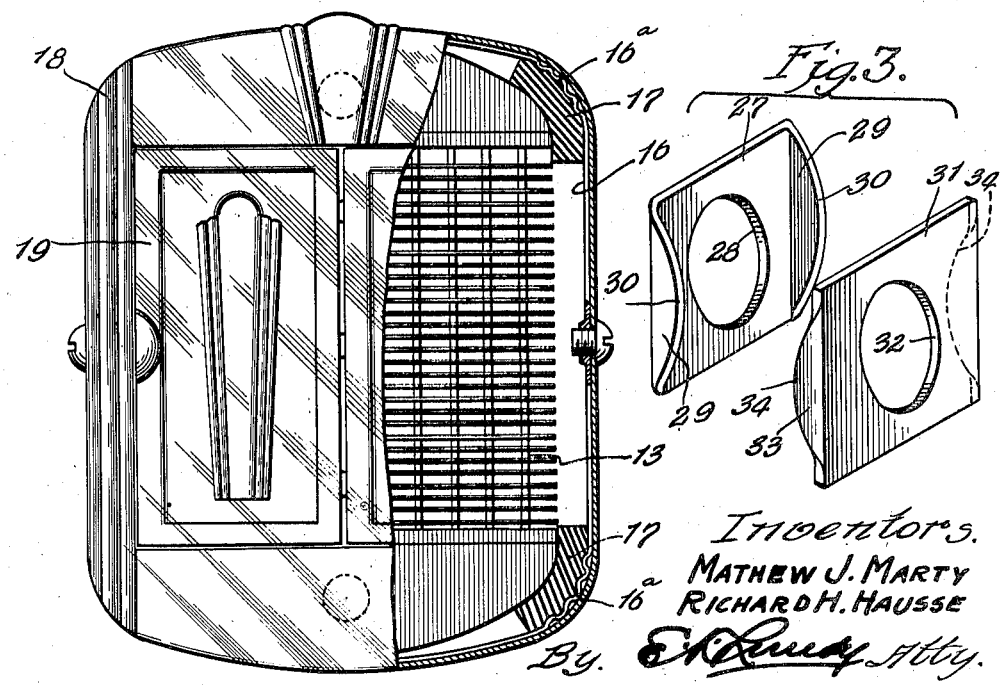
Inventors.
MATHEW J. MARTY
RICHARD H. HAUSSE Patented Sept. 24, 1935

2,015,231

UNITED STATES PATENT OFFICE 2,015,231

AUTOMOBILE HEATER

Mathew J. Marty and Richard H. Hausse, Chicago, Ill.

Application December 7, 1934, Serial No. 756,423

12 Claims. (Cl. 257—137)

This invention relates to heaters for the interiors of closed automobiles and particularly the type of heater which utilizes the hot fluid that is circulated in the engine cooling system.

Heaters of the type mentioned usually shunt the hot fluid or hot water from the engine cooling system to a small radiator located within the passenger compartment and it is customary to warm the air in the compartment by blowing or circulating it by a fan through the air spaces in the radiator. The fan, for convenience, is usually one that is driven by an electric motor which is connected with the electric battery with which the vehicle is equipped.

In vehicles having sloping or curved dashboards considerable difficulty is encountered in attempting to properly mount the heater radiator, and to this end provision is made in the present structure that permits the heater to be readily attached to irregularly shaped dashboards without the necessity of requiring the mechanic, making the installation, devise and make special fittings for each particular job.

In connection with the mounting of the heater radiator provision is made whereby the radiator is enclosed within a suitable casing that has tubular lateral stubs to provide housings for the inlet and outlet pipes leading to and from the radiator, and it is these housings that are attached to the dashboard instead of the pipes as has heretofore been the usual practice. Both the radiator and the pipes are cushioned in the respective casing and housings so that vibration between the parts is overcome and the resultant noise is eliminated.

Numerous objects and advantages are in mind in devising the present structure, among which may be mentioned the provision of an automobile heater that is novel and simple in construction; is capable of being readily installed upon practically any type or shape of dashboard; is dependable in operation; is made of sturdy parts so that it will withstand severe usage; and which is economical to manufacture so that it may be sold to the user for a reasonable retail price.

The foregoing and other objects are accomplished and the invention is practiced in substantially the manner hereinafter fully described, reference being made to the accompanying drawing that forms a part of this specification and which shows a typical or preferred embodiment of the automobile heater and the mounting and control devices.

In the drawing:—

Fig. 1 is a vertical side elevation showing the heater installed upon a sloping dashboard, the lower portion of the structure being shown in vertical section.

Fig. 2 is a front elevation with part of the radiator casing broken away to show the manner of cushioning the heater radiator.

Fig. 3 is a perspective of a pair of coacting devices used in mounting the heater.

In the drawing the dash board 10 is shown as inclined instead of vertical. In the newer types of automobiles the manufacturers have departed from the old-style vertically disposed dashboard and have inclined or curved the same in order to position the front seat of the vehicle farther forward than heretofore so that the dashboard inclines or curves upwardly partly over the motor. The instrument board is indicated by the numeral 11 and the cowl is represented at 12.

The heater comprises a cellular body 13 that circulates the hot fluid from the engine cooling system and also permits air to be blown between the radiator coils for the purpose of taking up such heat and distributing the warmed air in the car body. The radiator receives the hot fluid through an inlet pipe 14 and returns the hot fluid to the cooling system through an outlet pipe 15. The radiator is surrounded by a metal casing 16 that conforms generally to the shape of the radiator and is spaced therefrom a slight distance so as to permit insertion of cushioning means between the radiator and the casing. The cushioning means which it is preferred to use comprises heavy pads 17 of rubber or rubber composition that are inserted between the outer corners of the radiator body and the inner corners of the casing 16 and suitable crimping 16ª is formed in the corners of the casing so as to retain the cushioning pads in position and prevent dislodgement.

The front of the casing facing into the vehicle is closed by a front plate 18 in which one or more hinged doors 19 are provided so that the front of the casing may be opened to permit discharge of the warm air in desirable directions. The rear of the casing is provided with a large opening in which the fan 20 is disposed, such fan being mounted upon the shaft or spindle of a small electric motor 21 that derives its energy from the electric battery with which the vehicle is equipped. The motor is mounted upon a bridge bar 22 extending across the opening in the rear of the casing between the motor and the fan, which bridge bar is provided with an opening in which the motor spindle is positioned.

Heretofore it has been the practice to mount the feed and return pipes 14 and 15 by means of suitable clamps to secure such pipes directly to the dashboard, but this arrangement has inherent objections because of the fact that continued vibration of the vehicle while in use frequently loosens the connections between the pipes and the radiator or between the pipes and the cooling system, causing the fluid to leak out. The above mentioned inherent objection is overcome by cushioning the pipes within suitable housings and by attaching said housings direct to the dash board so that vibration is taken up by said cushions as well as the rubber pads 17 which cushion the radiator within its casing.

The rear of the casing 16, where the pipes 14 and 15 pass out of the same, is provided with upper and lower hollow housings 23 that are of larger inner diameters than the exterior diameters of the respective pipes so that they surround such pipes to within a short distance of the ends of the latter. The ends of the housing are provided with flanged bushings 24 of rubber or rubber composition so as to snugly fit between the end portions of said housings and the adjacent portions of the pipes to cushion the latter.

The housings may be formed integrally with the casing 16, or they may be separate parts that are brazed or welded thereto, or they may be separate parts removably secured to the casing by bolts, rivets, or the like. It is preferred, however, to form the housings integrally with or welded to the casing 16 in order to provide a unitary structure.

The major portions of the housings 23 are threaded as shown in the drawing and such threaded portions pass through suitable openings in the dashboard so that the heater may be mounted in a desirable position on the dashboard below the cowl and between the instrument board and the dashboard, substantially shown. The securing means comprise locking or clamp nuts 25 and 26 that are disposed on the housings upon opposite sides of the dashboard 10. Suitable rocker members are placed next to the dashboard and engage the inner and outer surfaces thereof. These rocker members each consists of a rectangular plate 27 having a central hole 28 therein through which the housing 23 is disposed and the vertical edges of the plate 27 are provided with lateral flanges 29 disposed parallel to each other and having segmentally shaped or curved rocker edges 30.

Interposed between the rocker members and the nuts 25 and 26 are retainer washers. Each retainer washer consists of a preferably rectangular plate 31 having a central hole 32 to surround the housing 23 and the vertical edges of such plates are provided with lateral retainer flanges 33 that have curved or segmental edges 34 extending towards the respective rocker member with which the washer coacts. The flanges 33 of the retainer washers are spaced apart a distance sufficient to permit the rocker flanges 30 of the opposing rocker member to be received between them in the manner shown. The flat faces of the retainer washers are engaged on their outside by the respective nuts 25 and 26 and the curved or segmental edges 30 of the rocker members engage and rock on the adjacent surfaces of the washer plates so that the rocker members may be tilted parallel to each other to different angles with respect to the retainer washers in order to accommodate themselves to the inclination or irregular shape of the dashboard.

It will be seen the faces of the rocker members next each side of the dashboard are parallel to each other and the plates 31 of the retainer washers are likewise parallel to each other, although it will be seen that the plane of the plates 27 of the rocker members may be oblique to the plane of the plates 31 of the retainers.

By tightening the nuts upon the opposite sides of the dashboard the elements between such nuts are drawn together firmly upon each side of the dashboard and the rocker members will be tilted to take care of irregularity in shape of the dashboard and will permit the radiator and its casing to be mounted in a vertical position regardless of the slope of the dashboard.

Modifications of the structure herein shown may be made without departing from the principles involved, and it should be noted that the drawing and the within description are given for the purpose of understanding only and that no unnecessary limitations are to be understood therefrom.

What is claimed as new, is:—

1. An automobile heater comprising a radiator structure, a lateral member projecting therefrom, a support through which said member extends, and means for securing said member to said support, said means consisting of nuts screwed upon said member on opposite sides of the support, a washer next each nut, and rocker elements having flat portions that engage said support, said elements having curved portions that engage said washers.

2. An automobile heater comprising a radiator structure, a lateral member projecting therefrom, a support through which said member extends, and means for securing said member to said support, said means consisting of nuts screwed upon said member on opposite sides of the support, washers on said member on each side of and engaging said support, and rocker elements having flat portions that engage said nuts, said elements having curved portions that engage said washers.

3. An automobile heater comprising a radiator structure, a lateral member projecting therefrom, a support through which said member extends, and means for securing said member to said support said means consisting of nuts screwed upon said member on opposite sides of the support, a washer next each nut, rocker elements having flat portions that engage said support, said elements having curved portions that engage said washers, washers on said member on each side of and engaging said support, and rocker elements having flat portions that engage said nuts, said elements having curved portions that engage said washers.

4. An automobile heater comprising a radiator structure, a lateral member projecting therefrom, a support through which said member extends, and means for securing said member to said support said means consisting of nuts screwed upon said member on opposite sides of the support, a washer next each nut, rocker elements having flat portions that engage said support, said elements having curved portions that engage said washers, washers on said member on each side of and engaging said support, rocker elements having flat portions that engage said nuts, said elements having curved portions that engage said washers, and retainer flanges on the edges of said washers that project therefrom outside the curved portions of said rocker members.

5. An automobile heater comprising a radiator structure, a support, a lateral member projecting from said radiator structure through said support, and securing means consisting of nuts screwed upon said member on opposite sides of the support, washers on said member next said nuts, and compensating devices interposed between the respective washers and adjacent faces of the support and adapted to tilt to flatly engage the faces of the support.

6. A device of the kind described comprising a heater, a support therefor, a lateral member projecting from said heater through said support, an element on said member providing an abutment against one side of said support, an adjustable element on said member disposed on the other side of said support, and a compensating device interposed between said adjustable element and the support and adapted to tilt to flatly engage the adjacent face of the support.

7. A device of the kind described comprising a heater, a support therefor, a threaded lateral member projecting from said heater through said support, an element on said member providing an abutment against one side of said support, a nut and washer mounted on the threaded lateral member on the other side of said support, and a compensating device interposed between said washer and the support and adapted to tilt to flatly engage the adjacent face of the support.

8. A device of the kind described comprising a heater, a support therefor, a lateral member projecting from said heater through said support, an element on said member providing an abutment against one side of said support, an adjustable element on said member disposed on the other side of said support, and a rocker device on said member urged by said adjustable element against the adjacent face of said support.

9. A device of the kind described comprising a heater, a support therefor, a threaded lateral member projecting from said heater through said support, an element on said member providing an abutment against one side of said support, a nut and washer mounted on the threaded lateral member on the other side of said support, and a rocker device on said member urged by said nut against the adjacent face of said support.

10. A mounting comprising a support, a member extending obliquely therethrough and supported thereby, an element on said member abutting one side of said support, a device adjustable on said member on the other side of said support, and means having plane and curved portions that engage with the adjacent face of the support and said adjustable device.

11. A device of the kind described comprising a support, a heater provided with inlet and outlet pipes extending through said support, a housing within which said heater is mounted, tubes projecting from said housing around said pipes and extending through the support to space said pipes from said support, abutments on said tubes engaged with one side of said support, adjustable elements on said tubes disposed on the other side of said support, and means interposed between said adjustable elements and the support, a portion of said means being so shaped that a tilting movement with respect to said tubes is imparted to said means by said adjustable elements.

12. A device of the kind described comprising a support, a heater provided with inlet and outlet pipes extending through said support, a housing within which said heater is mounted, tubes projecting from said housing around said pipes and extending through the support to space said pipes from said support, abutments on said tubes engaged with one side of said support, adjustable elements on said tubes disposed on the other side of said support, and rocking means interposed between said adjustable elements and the support and adapted to tilt to engage flat against the adjacent face of the support.

MATHEW J. MARTY.
RICHARD H. HAUSSE.